United States Patent
Morales

(10) Patent No.: US 7,072,988 B1
(45) Date of Patent: Jul. 4, 2006

(54) KEY-BASED COLLISION DETECTION ALGORITHM FOR MULTI-INITIATOR DOMAIN VALIDATION

(75) Inventor: Carlos H. Morales, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/540,163

(22) Filed: Mar. 31, 2000

(51) Int. Cl.
*G06F 15/16* (2006.01)

(52) U.S. Cl. .................................. 709/253; 710/8
(58) Field of Classification Search .................. 711/114; 395/828; 370/445; 713/201; 380/3; 710/107, 710/52, 8; 719/321, 326
See application file for complete search history.

(56) References Cited

U.S. PATENT DOCUMENTS

| | | | |
|---|---|---|---|
| 5,386,517 A * | 1/1995 | Sheth et al. ................... | 710/60 |
| 5,890,014 A * | 3/1999 | Long .............................. | 710/8 |
| 6,263,445 B1 * | 7/2001 | Blumenau ................... | 713/201 |
| 6,266,731 B1 * | 7/2001 | Riley et al. .................. | 710/313 |
| 6,339,599 B1 * | 1/2002 | Hwang et al. ............... | 370/445 |
| 6,405,272 B1 * | 6/2002 | Regis .......................... | 710/121 |
| 6,658,459 B1 * | 12/2003 | Kwan et al. ................. | 709/217 |
| 6,834,326 B1 * | 12/2004 | Wang et al. ................. | 711/114 |

OTHER PUBLICATIONS

W. David Schwaderer, White Paper-Domain Validation Explained, Copyright 1999 Adaptec, Inc. Printed in USA Nov. 1999.*
W. Schwaderer, *"Domain Validation-Explained"*, Adaptec, Inc., Milpitas, CA www.adaptec.com/technology/whitepapers/domainvalidation.html.
M. Delsman, *"What's Next for SCSI"*, Adaptec, Inc., Milpitas, CA. www.adaptec.com/technology/whitepapers/ultra160.html.

* cited by examiner

*Primary Examiner*—Gilberto Barrón, Jr.
*Assistant Examiner*—Ellen C Tran
(74) *Attorney, Agent, or Firm*—Martine Penilla & Gencarella, LLP

(57) ABSTRACT

A method for verifying bus performance in a multiple initiator environment is provided. A first initiator generates a key data pattern including a key header and a pattern. The first initiator then writes the key data pattern to an echo buffer of a target after which the first initiator reads the key data pattern. The first initiator also examines the key header to ascertain a level of communication integrity of a physical connection with the target.

24 Claims, 4 Drawing Sheets

KEY-BASED COLLISION DETECTION ALGORITHM FOR MULTI-INITIATOR DOMAIN VALIDATION

BACKGROUND OF THE INVENTION

1. Field of the Invention

This invention relates generally to the determination of proper data transfer rates between computer systems and target peripherals, and more particularly to the verification of bus performance in a multiple initiator environment.

2. Description of the Related Art

In the computer industry, it is well known that computer systems communicate with various target devices such as hard disk drives, CD-ROMs, Zip™ drives, floppy disk drives, etc. Generally, IDE (Integrated Drive Electronics) or SCSI (Small Computer System Interface) controllers are used to operate the protocol which enables the transfer of information between the computer systems and the target devices. As is well known, SCSI technology permits communication between a computer system and multiple devices.

Generally, a SCSI controller is located on a SCSI host adapter card (also known as an initiator). The SCSI host adapter card is typically connected to a motherboard of a computer system by way of a PCI connection. A SCSI cable connects the SCSI card to a SCSI target device. A SCSI cable or a group of SCSI cables connecting multiple targets therefore defines a SCSI bus through which the SCSI controller communicates with SCSI target devices. In one example, a SCSI hard disk drive is connected with a SCSI controller through a SCSI bus. The SCSI controller on the SCSI card further enables the transfer of data between the target device (i.e., the SCSI hard disk drive) and the computer system.

In the past, there have been many forms of SCSI controllers with different data throughput capabilities. The latest incarnation of the SCSI controller is the Ultra 160™ class of controllers, which are available from Adaptec Inc., of Milpitas, Calif. Currently, a process called Domain Validation (DV) verifies the computer system configuration to ensure that an optimal bus speed can be attained. DV sets and confirms data transfer speeds through the SCSI bus which connects the computer system and the target device. Usually, DV has two separate levels of testing, a basic level testing and an enhanced level testing. In basic level testing, an initiator first communicates with a target device using an asynchronous data transfer mode. The initiator then requests that the target device send back a data pattern. The target device generates the data pattern and transmits it to the initiator. After a successful data transfer, the initiator saves the first 36 characters of the data that is received. The initiator then negotiates a throughput speed with the target device using synchronous communications. After a throughput speed has been negotiated, the initiator again requests that the target device send back the data pattern (using synchronous data transfer) it had received previously from the target. The initiator then compares the first 36 bytes of the data from the second exchange with the first 36 bytes of data it had received in the first exchange. If the data is not corrupted, the initiator proceeds to enhanced level testing.

In enhanced level testing, the initiator compares generic data transmitted to the target device with the data echoed back from the target device. To do this testing, the initiator first communicates with the target device through a SCSI bus to: 1) check if an echo buffer is available, and 2) determine the size of the echo buffer. The echo buffer is generally a character buffer in the target device which has the ability to store data temporarily. After verifying the existence and the size of the echo buffer, the initiator sends data to the echo buffer of the target device using a write buffer command. The target device receives the data from the initiator and stores it in the echo buffer. After sending the data, the initiator retrieves the data from the echo buffer by using a read buffer command. Upon receiving the read buffer command, the target device sends the data stored in the echo buffer back to the initiator. All of this is done while using the throughput speed negotiated in the previous basic testing phase. The initiator then checks the received data with the data it sent out to the echo buffer. If the received data is corrupt, the initiator commences renegotiations with the target to determine a lower bus throughput speed. Unfortunately, this system of domain validation is predicated upon having a system with only one initiator.

Problems may occur when multiple computer systems are connected to the same target devices in a SCSI environment. Unfortunately, in these circumstances, more than one initiator may conduct a DV enhanced level testing at one time. Therefore, multiple initiators may send data to one echo buffer almost simultaneously. In that case, the first initiator writes into the echo buffer, and a second initiator then overwrites the data from the first initiator. This overwriting is also commonly known as a collision. If this collision occurs before the first initiator's data is sent back, the echo buffer will send the data from the second initiator to the first initiator. Problematically, the first initiator may be fooled into believing that data received from the echo buffer was corrupted because it received the data written by another initiator. Unfortunately, this results in the first initiator lowering the data transfer rate because it believes that the bus cannot handle the negotiated throughput speed.

The prior enhanced level DV has a further disadvantage. A problem may occur when the first initiator sends the exact same generic data pattern to the echo buffer as the second initiator. If the data sent by the first initiator becomes corrupted but is overwritten by uncorrupted data from the second initiator, the echo buffer may send back uncorrupted data to the first initiator. The first initiator would then be fooled into believing that the negotiated throughput speed was correct. This overwriting/collision could lead to inaccurate data transfer because the system would be using throughput speeds the bus configuration is incapable of handling.

It should be apparent that using the aforementioned DV in a multiple initiator environment is inefficient and could create various data transfer problems. Such a DV may lead to less than optimal throughput speeds or, worse yet, transfer of corrupted data. Consequently, the prior DV method is an unattractive option for bus performance verification in a multiple initiator environment.

In view of the foregoing, there is a need for a DV system that avoids the problems of the prior art by improving the verification of bus performance and optimizing data throughput and data transfer accuracy.

SUMMARY OF THE INVENTION

Broadly speaking, the present invention describes a method for the determination of proper data transfer rates between computer systems and target peripherals, and more particularly to the verification of bus performance in a multiple initiator environment. It should be appreciated that the present invention can be implemented in numerous ways, including as a process, an apparatus, a system, a device, a method, or a computer readable medium. Several inventive embodiments of the present invention are described below.

In one embodiment, a method for verifying bus performance in a multiple initiator environment is provided. A first initiator generates a key data pattern including a key header and a pattern. The first initiator then writes the key data pattern to an echo buffer of a target after which the first initiator reads the key data pattern. The first initiator also examines the key header to ascertain a level of communication integrity of a physical connection with the target.

In another embodiment, a computer implemented method for verifying bus performance in a multiple initiator environment is provided. In this embodiment, there is at least a first initiator and a second initiator in communication with a target device. The first initiator generates a key data pattern and sends a write echo buffer (WEB) command to write the key data pattern to an echo buffer of the target. After sending the WEB command, the first initiator sends a read echo buffer (REB) command to the echo buffer. The REB command requests a transmission of the key data pattern from the echo buffer to the first initiator. The first initiator then examines the key data pattern received from the echo buffer to ascertain a level of communication integrity of a physical connection between the first initiator and the target device.

In another embodiment, a computer readable media having program instructions for verifying bus performance in a multiple initiator environment is provided. This embodiment includes at least a first initiator and a second initiator which are in communication with a target device. The computer readable media has program instructions for generating a key data pattern and program instructions for sending a write echo buffer (WEB) command to write the key data pattern to an echo buffer of the target. The computer readable media also has program instructions for sending a read echo buffer (REB) command to the echo buffer. The REB command requests a transmission of the key data pattern from the echo buffer to the first initiator. The computer readable media also has program instructions for examining the key data pattern received from the echo buffer to ascertain a level of communication integrity of a physical connection between the first initiator and the target device.

The advantages of the present invention are numerous. Most notably, by creating a method by which bus performance can be reliably determined in a multiple initiator environment, data throughput can be optimized without fear of losing data integrity. The claimed invention reduces the problems of collisions in. Domain Validation enhanced level testing so devices linked to more than one computer system by communication apparatuses, such as SCSI buses, can interact more effectively. Therefore, the present invention increases computer system efficiency and allows users to take advantage of the connective powers inherent in SCSI or SCSI-like systems.

The present invention allows detection of data overwrites (collisions) when multiple initiators are transmitting data to one echo buffer. When collisions can be detected accurately, the true throughput capabilities of the SCSI bus (or other connective mechanism) may be ascertained. This leads to optimal throughput speeds, accurate data transfer, and other advantages of enhanced level testing not previously attainable in multiple initiator environments such as detection of incorrect cable impedance, incorrect SCSI device spacing, poor or marginal termination, marginal transceivers, excessive crosstalk sensitivity, and excessive system noise.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for verification of bus performance in a multiple initiator environment. It will be obvious, however, to one skilled in the art, that the present invention may be practiced without some or all of these specific details. In other instances, well known process operations have not been described in detail in order not to unnecessarily obscure the present invention.

Figure 1:
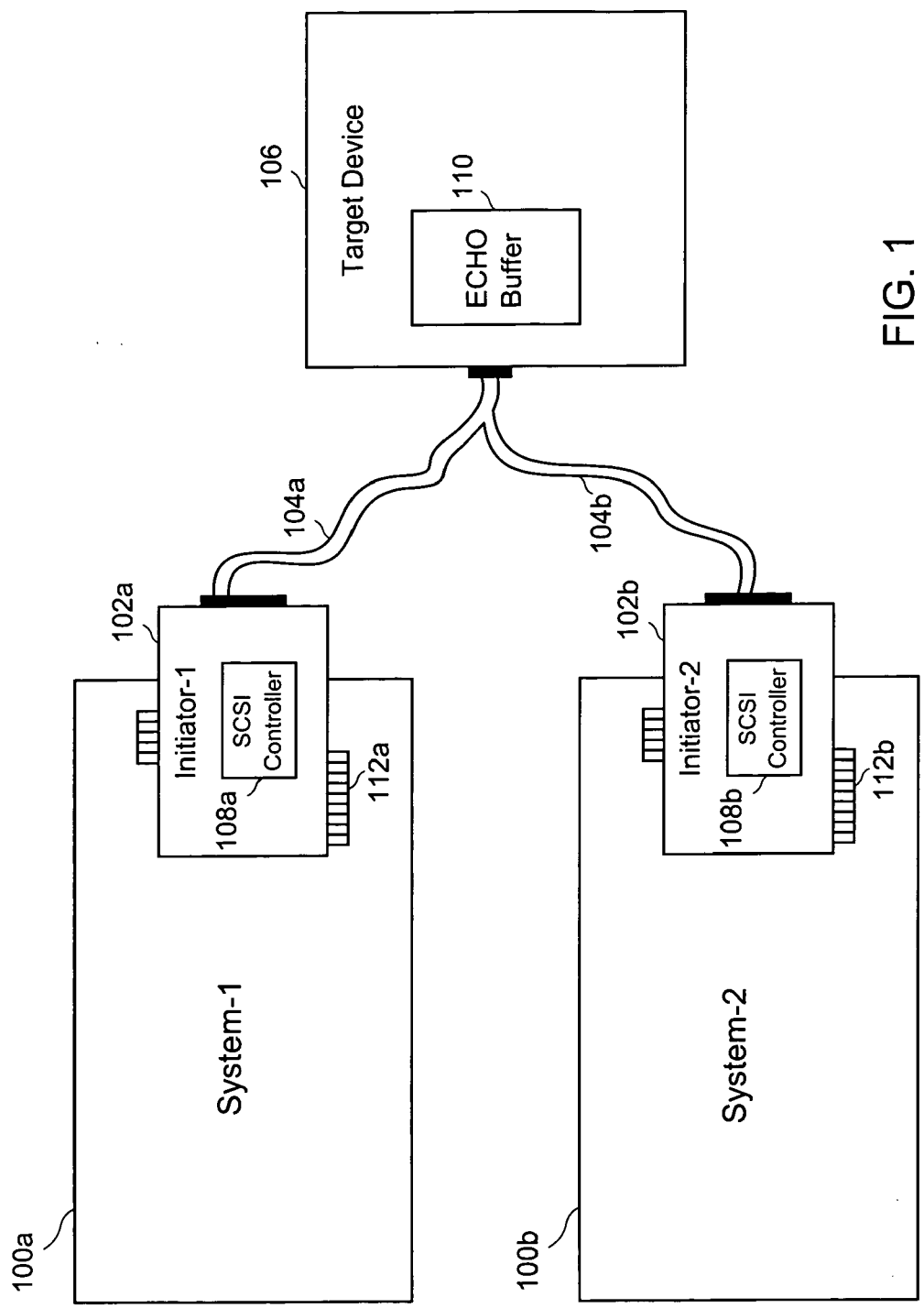
FIG. 1 shows a multiple initiator environment in which initiators of different systems are in communication with a common device, in accordance with one embodiment of the present invention.

FIG. 1 shows a multiple initiator environment in which initiators of different systems are in communication with a common device, in accordance with one embodiment of the present invention. In this embodiment, a system-1 100a and a system-2 100b are attached to a target device 106. An initiator-1 102a is attached to the system-1 100a through a PCI connection 112a. A SCSI controller 108a is contained within the initiator-1 102a. The initiator-1 102a communicates with the target device 106 through a SCSI cable 104a which defines a SCSI bus. An initiator-2 102b is attached to the system-2 100b through a PCI connection 112b. A SCSI controller 108b is contained within the initiator-2 102b. The initiator-2 102b communicates with the target device 106 through a SCSI cable 104b which also defines a SCSI bus. As shown, the target device 106 contains an echo buffer 110. As is well known, the target device 106 can be any type of SCSI peripheral device, such as, a hard drive, an optical disc drive, and the like. Therefore, the target devices 106 will include other circuitry and software to enable its specific function in addition to the echo buffer 110.

In this embodiment, when the system-1 100a powers up, the initiator-1 102a utilizes the SCSI cable 104a to locate the target device 106. After locating the target device 106, the initiator-1 102a uses a Domain Validation (DV) process to negotiate and confirm an optimal throughput speed with the target device 106. In DV, the initiator-1 102a first goes through basic level testing to determine an initial throughput speed. Once basic level testing is done, the initiator-1 102a advances to enhanced level testing. At this point, the initiator-1 102a generates a key data pattern 113 (as shown below in FIG. 2) which provides information regarding the host and initiator-1 102a. The components of the key data pattern 113 are described below in reference to FIG. 2. The key data pattern 113 is then transmitted to the target device 106 and stored within the echo buffer 110. Once transmission to the target device 106 is complete, the initiator-1 102a requests return of the key data pattern 113 from the echo buffer 110.

At almost the same time, the system-2 100b powers up. The intiator-2 102b utilizes the SCSI cable 104b to locate the target device 106. After locating the target device 106, the initiator-2 102b uses DV to negotiate and confirm an optimal throughput speed with the target device 106. To do this, the initiator-2 102b first goes through basic level testing to determine an initial throughput speed. Once basic level testing is completed, the initiator-2 102b commences DV enhanced level testing. At this stage, the initiator-2 102b generates the key data pattern 113 which identifies the initiator-2 102b. The key data pattern 113 from the initiator-2 102b is then transmitted to the target device 106 and arrives right after the key data pattern 113 from the initiator-1 102a written in the echo buffer 110.

At this stage, the key data pattern 113 from the initiator-1 102a may be overwritten (or collided) by the key data pattern 113 from the initiator-2 102b. By use of various methods of collision detection as described below in reference to FIGS. 3 and 4, the initiator-1 102a will be able to determine if collision has taken place. If collision has taken place, the initiator-1 102a will have to re-send the key data pattern 113 to the echo buffer 110 for further throughput testing. If overwriting has not taken place, the inatator-1 102a can determine if the SCSI cable 104a (i.e., SCSI bus) was capable of the throughput speed previously negotiated. Therefore, this embodiment confirms the correct SCSI bus data transfer rate and prevents communication of corrupt data in a multiple initiator environment.

Figure 2:
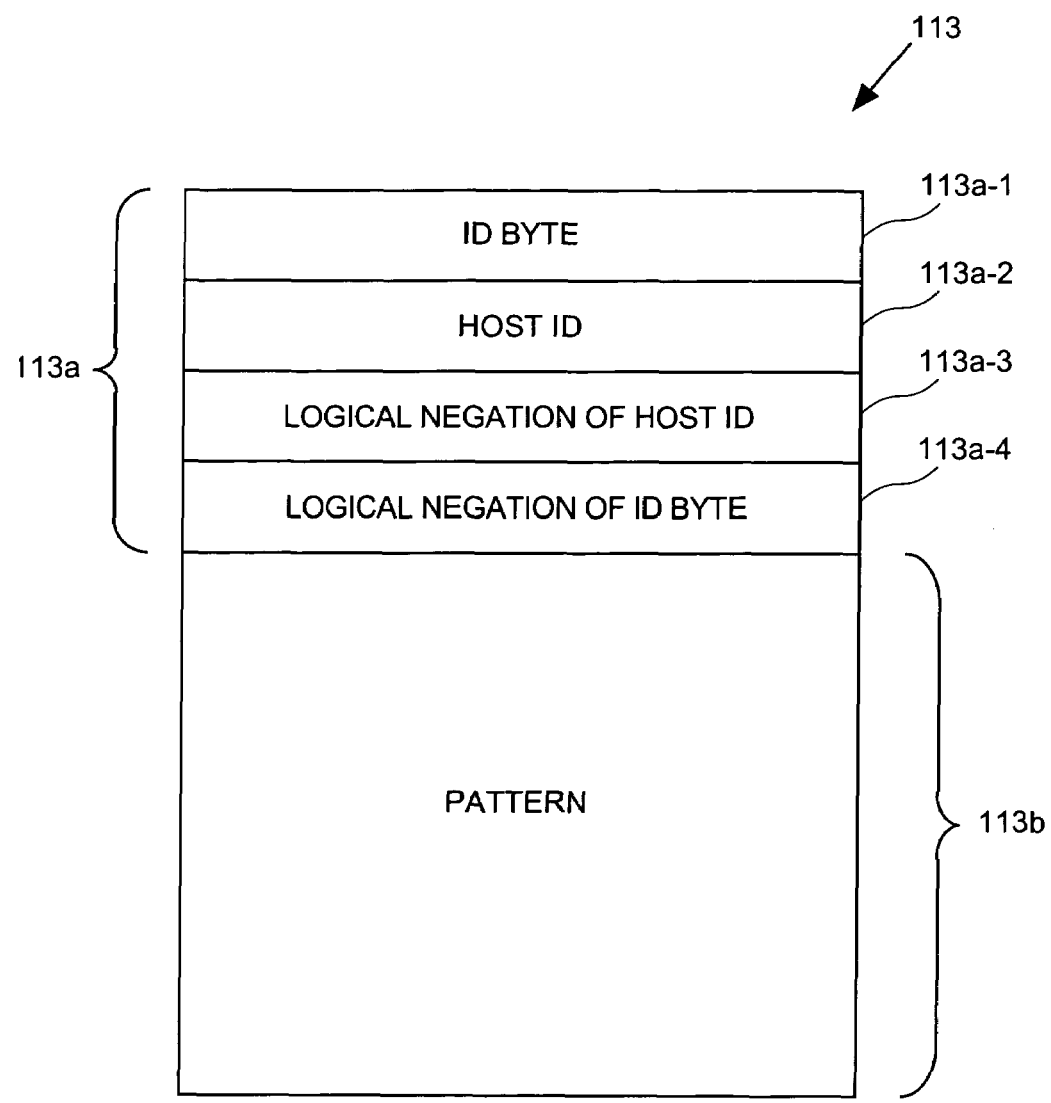
FIG. 2 depicts the key data pattern in accordance with one embodiment of the present invention.

FIG. 2 depicts the key data pattern 113 in accordance with one embodiment of the present invention. During DV enhanced level testing, the key data pattern 113 is used to confirm the negotiated throughput speed between the initiator and the target device. In one embodiment of the present invention, the key data pattern 113 preferably has a key header 113a and a pattern 113b. It should be appreciated that the key data pattern 113 can be made up of any data which would provide evidence of corruption at incorrect data throughput speeds. The pattern 113b is either a default pattern out of SCSI specifications or an application defined data.

In one embodiment, the key header 113a preferably has four subparts. It should be appreciated that the key header 113a may be created with any number of subparts or may contain any type of information as long as the origin of key header 113a can be determined. In this embodiment, the key header 113a contains an ID byte 113a-1 (byte 0), a host ID 113a-2 (byte 1), a logical negation of host ID 113a-3 (byte 2), and a logical negation of ID byte 113a-4 (byte 3). The ID byte 113a-1 is generally a manufacturer ID while the host ID 113a-2 is usually an ID byte for a specific initiator. The logical negation of host ID 113a-3 is a negation of the bits that make up the host ID 113a-2, and the logical negation of ID byte 113a-4 is a negation of the bits that make up the ID byte 113a-1. As explained further below in reference to FIGS. 3 and 4, the initiator-1 102a examines the subparts of the key header 113a with various methods to determine the origin of the key data pattern 113. If the subparts of the key header 113a which were received by the initiator-1 102a indicate that the key data pattern 113 was written by the initiator-2 102b, the initiator-1 102a would know that a collision had taken place.

Consequently, with the use of the key header 113a, the initiator-1 102a can determine if it is receiving back the key data pattern 113 it sent to the echo buffer 110. Therefore, use of the key data pattern 113 by the initiators 102 has the advantage of more accurately confirming the negotiated data transfer speed in the SCSI bus without the worry that a collision has disrupted the integrity of the enhanced level DV.

Figure 3:
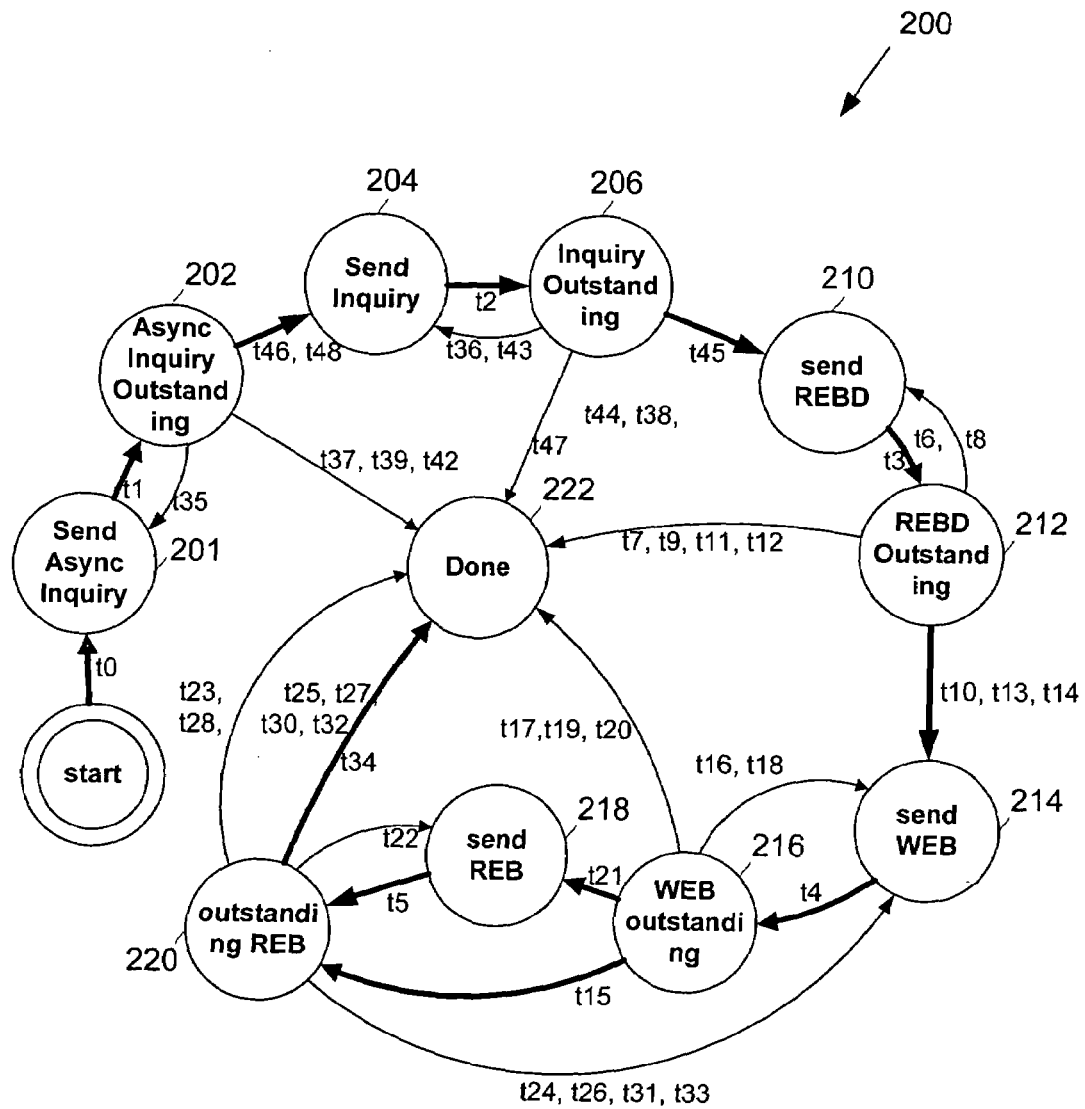
FIG. 3 shows a state diagram of an Advanced Domain Validation state machine in accordance with one embodiment of the present invention.

FIG. 3 shows a state diagram 200 of an Advanced Domain Validation state machine in accordance with one embodiment of the present invention. The state diagram 200 depicts various states of the initiator-1 102a while controlled by a computer software/driver during the DV process. As used herein, the initiator-1 102a is used to illustrate initiator functionality. However, the initiator can be any one of the illustrated initiators of FIG. 1 or the like. The different state transitions used in the state diagram 200 are detailed fully in a transition table below. The start of the DV process is shown by transition t0 which leads to a first command given by the software to the initiator-1 102a. The initiator-1 102a sends an asynchronous inquiry command 201 to the target device 106 as indicated by t1 which is generally an establishment of asynchronous communication. The asynchronous inquiry command 201 requests that the target device 106 transmit a valid data pattern to the initiator-1 102a. During an asynchronous inquiry outstanding state 202, the target device 106 generates the valid data pattern which is transmitted to the initiator-1 102a. If the transmission is not successful, the asynchronous inquiry 201 is transmitted again as indicated by transition t35 which is generally a retry action. If an error occurs and DV cannot be completed, the DV process terminates as reflected generally by transitions t37, t39, and t42, shown as done 222. Transitions t46 and t48 reflect a successful transmission which results in the initiator-1 102a transmitting an inquiry command 204 to the target device 106. In the inquiry command 204, the initiator-1 102a requests that the target device 106 transmit another valid data pattern synchronously at a higher throughput speed. After transmission of the inquiry command 204, a synchronous communication is established between the initiator-1 102a and the target device 106 as reflected by transition t2. During the inquiry outstanding state 206 the target device 106 generates another data pattern and sends that data pattern back synchronously to the initiator-1 102a at a higher throughput speed. If transmission is not successful, the inquiry command 204 is transmitted again as shown generally by transitions t36 and t43. The inquiry command 204 and the inquiry outstanding state 206 are used to determine the optimal throughput speed of the SCSI bus and completes the basic level testing of DV.

After the basic level testing is successfully completed, DV continues with enhanced level testing as reflected by transition t45. In this testing phase, the initiator-1 102a sends a read echo buffer description (REBD) command 210 to the target device 106. The REBD command 210 requests that the target device 106 transmit certain information about the echo buffer 110 to the initiator-1 102a such as whether the echo buffer 110 exists, the size of the echo buffer 110, and whether the echo buffer 110 supports target based collision detection. As a result of the REBD command 210, the initiator-1 102a communicates with the target device 106 as shown by transition t3. If information about the echo buffer 110 is not successfully received, the REBD command 210 is retried as shown by transitions t6 and t8.

If the REBD command 210 cannot be completed, DV is terminated as shown generally by transitions t7, t9, t11, and t12. REBD outstanding state 212 shows the target device 106 while it is processing the REBD command 210. Transitions t10, t3, and t14 reflect the successful transmission of the information regarding the echo buffer 110 from the target device 106 to the initiator-1 102a. The state machine then generates the key data pattern 113 and sends a write echo buffer (WEB) command 214 to the echo buffer 110 as reflected by transition t4. The WEB command 214 writes the key data pattern 113 into the echo buffer 110 of the target device 106. As stated above in reference to FIG. 2, the key data pattern 113 consists of two main parts, the key header 113a and the pattern 113b. During a WEB outstanding state 216, the initiator-1 102a is waiting for the WEB command 214 to complete. If the WEB command 214 is not successful, the initiator-1 102a resends the WEB command 214 as indicated generally by transitions t16 and t18. If the WEB command 214 cannot be completed, DV terminates as reflected generally by transitions t17, t19, and t20.

The completion of the WEB command 214 is shown by transition t21 after which the initiator-1 102a sends a read echo buffer (REB) command 218 to the echo buffer 110. The REB command 218 requests that the echo buffer 110 transmit the key data pattern 113 back to the initiator-1 102a. If the REB command 218 is not successful, the REB command 218 is repeated as shown by transition t22. If the REB command 218 is successful as shown by transition t5, the initiator-1 102a receives the key data pattern 113 and examines it for signs of collision or corruption during the REB outstanding state 220.

In one embodiment of the present invention, the initiator-1 102a will preferably use one of three different levels of data collision detection. These three levels will be described in more detail in reference to FIG. 4. It should be appreciated that the initiator-1 102a may be configured to use driver software (e.g., that defines the state machine operations) that can be built to operate different data collision detection levels, as long as collision detection is effective. If a collision is detected during WEB outstanding state 220, the process is retried beginning from the WEB command 214 as shown generally by transitions t24, t26, t31, and t33. If the key data pattern 113 has been corrupted or the number of retries has been exhausted, DV terminates as indicated generally by transitions t25, t27, t30, and t32. If collision is not detected and the key data pattern 113 is not corrupted, DV is completed as shown by transition t34.

In one embodiment of the present invention, the WEB command 216 and the REB command 218 can be linked. This means that the WEB command 216 and the REB command 218 are performed continuously to prevent other initiators from gaining access to the SCSI bus. This linking prevents access to the echo buffer 110, thus "locking out" the initiator-2 102b which may be attempting to write to the echo buffer 110 before the REB command 218 from the initiator-1 102a can be completed. This linking is shown by transition t15 where the REB command 218 is skipped. In this way, a collision caused by the key data pattern 113 or any other data from the initiator-2 102b may be avoided.

Figure 4:
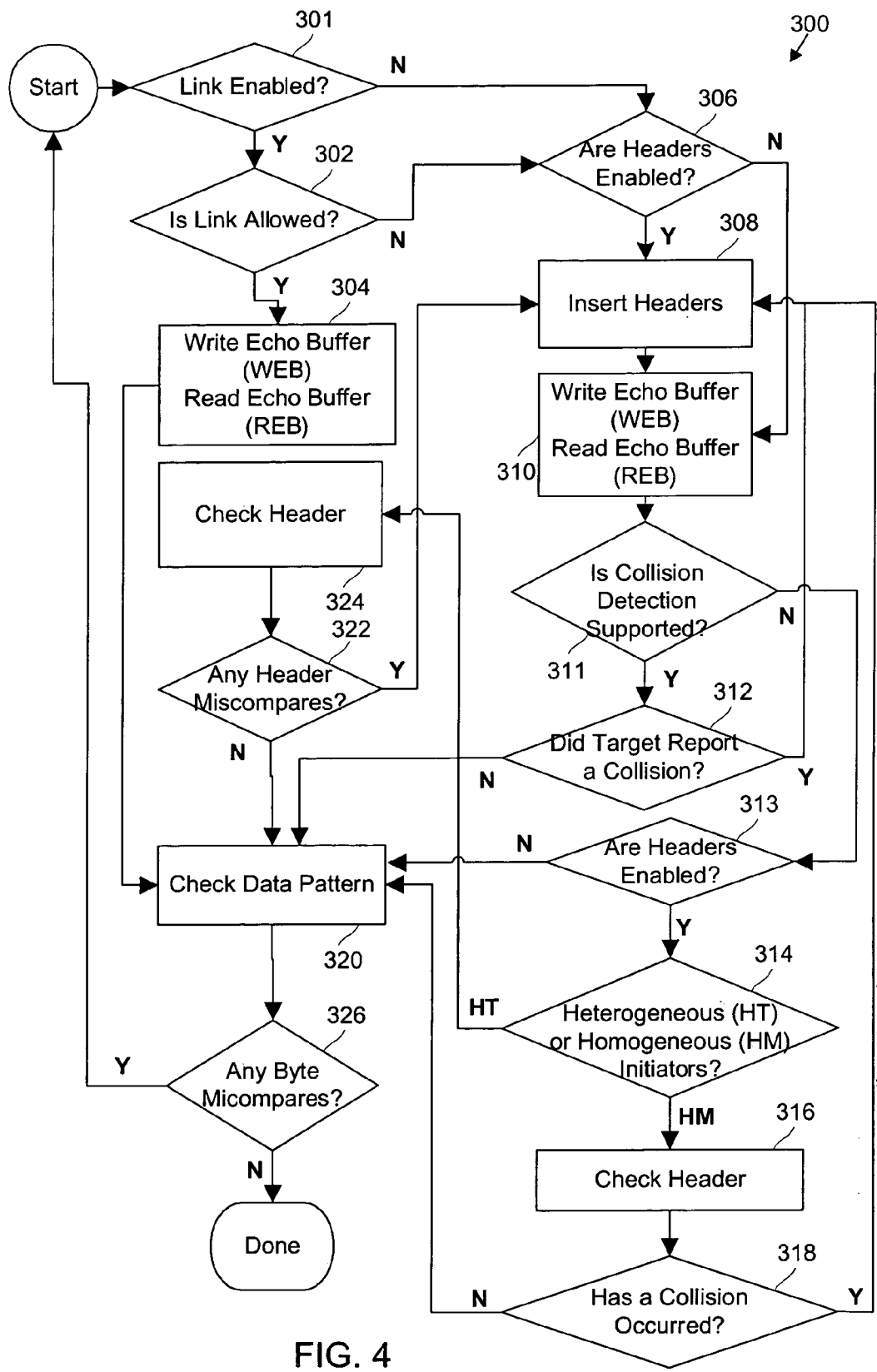
FIG. 4 depicts a flowchart illustrating a computer implemented method suitable for conducting multiple levels of collision detection, in accordance with one embodiment of the present invention.

FIG. 4 depicts a flowchart 300 illustrating a computer implemented method suitable for conducting multiple levels of collision detection, in accordance with one embodiment of the present invention. It should be understood that the processes depicted in the flow chart 300 may be in a program instruction form written on any type of computer readable media. For instance, the program instructions can be in the form of software driver code which can be transformed to handle specific ones of the multiple levels of collision detection. For completeness, the process flow of FIG. 4 will illustrate exemplary determinations that can be made to ascertain whether one of the collision detection levels should be used over another.

An initial operation 301 determines if linked commands are supported by the target device 106 (level 3 testing). If the linked commands are supported, operation 302 determines if links are allowed. If links are allowed, the WEB command 214 and the REB command 218 are linked and sent to the target device 106 by the initiator-1 102a. As used herein and above, the initiator-1 102a is used to illustrate initiator functionality. However, the initiator can be any one of the illustrated initiators of FIG. 1 or the like. In operation 304, the initiator-1 102a writes the pattern 113b into the echo buffer 110 and reads the pattern 113b from the echo buffer 110. During the operation 304, the initiator-2 102b cannot overwrite the echo buffer because the echo buffer 110 cannot be accessed by other commands. After the REB command 218 is performed, the initiator-1 102a examines the pattern 113b in operation 306. In operation 326, the initiator-1 102a determines if the pattern 113b has any byte miscompares (i.e., data corruption). If the pattern 113b is corrupted, the whole process starts over again at a lower throughput speed.

If the target device 106 does not support linked commands, the initiator-1 102a determines if headers are enabled in operation 306. If headers are supported, the intiator-1 102a by way of the state machine software attaches the key header 113a to the pattern 113b to form the key data pattern 113 in operation 308. During operation 310, the initiator-1 102a writes the key data pattern 113 into the echo buffer 110 and reads the key data pattern 113 back from the echo buffer 110. If the echo buffer 110 does not support headers, the operation 308 is bypassed and the operation 310 is carried out.

DV continues with operation 311 involving target based collision detection (level 0 testing). In the operation 311, it is determined whether the echo buffer 110 (target) has an ability to detect data collision errors. If the echo buffer 110 does not have target based collision detection capabilities (i.e., collision detection is not supported), operation 312 is skipped and the process resumes at operation 313 which determines whether headers are supported. If headers are not supported, the process resumes at operation 320, otherwise it resumes at operation 314 which determines whether homogeneous collision detection or heterogeneous collision detection is used. During operation 312, if the echo buffer 110 supports target-based collision detection, the echo buffer 110 will return an error indication upon the detection of a data collision. In that case, if the data collision does occur, the operations 308, 310, and 311, and 312 are repeated. If the echo buffer 110 supports target error detection and does not report a data collision then the process resumes at operation 320.

Operation 314 decides whether homogeneous collision detection (homogeneous testing) or heterogeneous collision detection (heterogeneous testing) is conducted. Homogeneous (HM) testing is used when the initiators 102 are from the same manufacturers (e.g., both initiators are from Adaptec Inc.). If the initiators 102 are from the same manufacturer, the format of the key header 113a produced by the state machines of the initiators 102 will be the same. Therefore, a more precise comparison testing method can be used to determine if collision has taken place. In one embodiment, the initiator-1 102a preferably utilizes a four element test to detect a data collision (this test is further explained below). It should be understood that other tests may be used to determine if data collision has occurred such as having different numbers or types of criteria in a test. If the initiators 102 are from different manufacturers, heterogeneous (HT) testing is used. In one embodiment of heterogeneous testing, the initiator 102a preferably determines if any one byte of the key header 113a has been overwritten. It should be appreciated that other types of testing may be used to determine if the key header 113a has been overwritten such as determining if multiple parts of the key header 113a have been changed.

If homogeneous (HM) testing (or level 1 testing) is used, operation 316 involves the initiator-1 102a using the aforementioned four level test to examine the key header 113a to see if a data collision has occurred in operation 318. In one embodiment, data collision is preferably assumed to have occurred when all four of the following criteria are met: 1) a byte 0 matches the ID byte; 2) a byte 1 does not match the host ID; 3) a byte 2 is a logical negation the byte 1; and 4) a byte 3 is a logical negation of the byte 0. Generally, the ID byte is a manufacturer signature ID, and the host ID is an initiator ID. If it is determined in operation 318 that a data collision has occurred, the enhanced level testing is repeated from the operation 308. If a data collision has not occurred, the operation 320 examines the pattern 113b. After the operation 320, the operation 326 determines if there is any byte miscompares (i.e., data corruption) in the pattern 113b. If there is a byte miscompare in the pattern 113b, the process starts all over again at a lower throughput speed. If there is no byte miscompare, the process terminates.

If heterogeneous testing (or level 2 testing) is determined in operation 314, the method moves to operation 324 where the key header 113a examined to check for data collision. The operation 322 ascertains if there is any header miscompare (e.g., if any data in the key header 113a has been changed). If the header miscompare exists, the process returns back to the operation 308 for a retry. If no miscompare is found, the initiator-1 102a examines the pattern 113b in the operation 320. After the operation 320, the operation 326 determines if any byte within the pattern 113b has been changed. If corruption has occurred, the whole process starts over at a lower throughput speed. If corruption has not occurred, the process terminates.

As can be seen, use of the key data pattern 113 and multiple level collision detection has the advantage of allowing confirmation and verification of the correct data throughput speed through the SCSI bus in the multiple initiator environment.

As mentioned above, the flowchart of FIG. 4 is provided to illustrate the flexibility of the state machine code and its ability to be configured to any desired testing level. Based on the desired level, more specific software drivers can be compiled and written onto a computer readable media for later execution and loading into a particular computer.

The state transition table provided below should be viewed as exemplary in nature, and therefore, modifications can be made within the scope of the appended claims. In certain circumstances, some transitions can be eliminated or replaced depending upon a desired implementation or operation. In addition, the specific names given to defined actions can take on different names or arrangement so long as the desired functions are executed.

State Transition Table

| Transition | State | Condition | Action | next |
|---|---|---|---|---|
| t0 | Start | | | SEND_ASYNC_INQUIRY |
| t1 | SEND_ASYNC_INQUIRY | | 1. build Async Inquiry IOB<br>2. force Async negotiation<br>3. Queue IOB | ASYNC_INQ_OUTSTANDING |
| t2 | SEND_INQUIRY | | 4. build Inquiry IOB<br>5. force negotiation<br>6. Queue IOB | INQ_OUTSTANDING |
| t3 | SEND_REBD | | 7. build REBD IOB<br>8. force negotiation<br>9. Queue IOB | REBD_OUTSTANDING |
| t4 | SEND_WEB | | 10. build WEB IOB<br>11. If Linking enabled and supported, set LINK bit<br>12. If OSM data pattern present, copy pattern from appropriate offset<br>13. If Header mode enabled, create header<br>14. force negotiation<br>15. Queue IOB | WEB_OUTSTANDING |
| t5 | SEND_REB | | 16. build REB IOB<br>17. force negotiation<br>18. Queue IOB | REB_OUTSTANDING |
| t6 | REBD_OUTSTANDING | (benign check \|\| reservation conflict \|\| busy) && retry count not exhausted | increment retry count | SEND_REBD |
| t7 | REBD_OUTSTANDING | (benign check \|\| reservation conflict \|\| busy) && retry count exhausted | indicate DV failed for this device<br>reset retry count | GET_NEXT_DEVICE |
| t8 | REBD_OUTSTANDING | (throttling check \|\| data error \|\| other exception) && throttling is possible | throttle | SEND_REBD |

State Transition Table -continued

| Transition | State | Condition | Action | next |
|---|---|---|---|---|
| t9 | REBD_OUTSTANDING | (throttling check \|\| data error \|\| other exception) && throttling is not possible | indicate DV failed for this device reset retry count | SEND_REBD |
| t10 | REBD_OUTSTANDING | illegal request && header or link collision handling enabled | set dvBufferSize to default reset retry count set dvReportedBufferSize to dvBufferSize | SEND_WEB |
| t11 | REBD_OUTSTANDING | illegal request && header or link collision handling not enabled | reset retry count force negotiation | GET_NEXT_DEVICE |
| t12 | REBD_OUTSTANDING | good completion && OEM1 && not Header/Link mode && EBOS is not set | reset retry count force negotiation | GET_NEXT_DEVICE |
| t13 | REBD_OUTSTANDING | good completion && (not OEM1 \|\| EBOS set) && buffer size < 16 | reset retry count force negotiation | GET_NEXT_DEVICE |
| t14 | REBD_OUTSTANDING | good completion && (not OEM1 \|\| EBOS set) && buffer size >= 16 | set dvBufferSize to nearest power of 2 reset retry count set dvReportedBufferSize to dvBufferSize | SEND_WEB |
| t15 | WEB_OUTSTANDING | Linked mode enabled && DvLinkedCommandStarted bit set | clear dvLinkedCommandStarted bit | REB_OUTSTANDING |
| t16 | WEB_OUTSTANDING | (benign check \|\| reservation conflict \|\| busy) && retry count not exhausted | increment retry count | SEND_WEB |
| t17 | WEB_OUTSTANDING | (benign check \|\| reservation conflict \|\| busy) && retry count exhausted | indicate DV failed for this device reset retry count | GET_NEXT_DEVICE |
| t18 | WEB_OUTSTANDING | (throttling check \|\| data error \|\| other exception) && throttling is possible | throttle reset dvBufferOffset (restart data pattern from beginning) reset dvBufferSize to dvReportedBufferSize | SEND_WEB |
| t19 | WEB_OUTSTANDING | (throttling check \|\| data error \|\| other exception) && throttling is not possible | indicate DV failed for this device reset retry count | GET_NEXT_DEVICE |
| t20 | WEB_OUTSTANDING | illegal request | reset retry count force negotiation | GET_NEXT_DEVICE |
| t21 | WEB_OUTSTANDING | good completion | reset retry count | SEND_REB |
| t22 | REB_OUTSTANDING | (benign check \|\| reservation conflict \|\| busy) && retry count not exhausted | increment retry count | SEND_REB |
| t23 | REB_OUTSTANDING | (benign check \|\| reservation conflict \|\| busy) && retry count exhausted | indicate DV failed for this device reset retry count | GET_NEXT_DEVICE |
| t24 | REB_OUTSTANDING | (throttling check \|\| data error \|\| other exception) && throttling is possible | throttle reset dvBufferOffset (restart data pattern from beginning) reset dvBufferSize to dvReportedBufferSize | SEND_WEB |
| t25 | REB_OUTSTANDING | (throttling check \|\| data error \|\| other exception) && throttling is not possible | indicate DV failed for this device reset retry count | GET_NEXT_DEVICE |
| t26 | REB_OUTSTANDING | echo buffer overwritten status && collision retries are not exhausted | reset retry count increment collision retry count wait 1ms * my SCSI ID | SEND_WEB |

-continued

State Transition Table

| Transition | State | Condition | Action | next |
|---|---|---|---|---|
| t27 | REB_OUTSTANDING | echo buffer overwritten status && collision retries are exhausted | indicate DV failed for this device reset retry count | GET_NEXT_DEVICE |
| t28 | REB_OUTSTANDING | illegal request | reset retry count force negotiation | GET_NEXT_DEVICE |
| t29 | REB_OUTSTANDING | good completion && header mode enabled && header miscompared && collision retries are not exhausted | reset retry count increment collision retry count wait 1ms * my SCSI ID | SEND_WEB |
| t30 | REB_OUTSTANDING | good completion && header mode enabled && header miscompared && collision retries are exhausted | indicate DV failed for this device reset retry count | GET_NEXT_DEVICE |
| t31 | REB_OUTSTANDING | good completion && data miscompare && not (t29 \|\| t30) && throttling is possible | throttle reset dvBufferOffset (restart data pattern from beginning) reset dvBufferSize to dvReportedBufferSize | SEND_WEB |
| t32 | REB_OUTSTANDING | good completion && data miscompare && not (t29 \|\| t30) && throttling is not possible | indicate DV failed for this device reset retry count | GET_NEXT_DEVICE |
| t33 | REB_OUTSTANDING | good completion && good data && more data to go | increment dvBufferOffset to next data reset retry count reset collision retry count | SEND_WEB |
| t34 | REB_OUTSTANDING | good completion && good data && no more data to go | indicate DV done for this device | GET_NEXT_DEVICE |
| t35 | ASYNC_INQ_OUTSTANDING | (benign check \|\| reservation conflict \|\| illegal request \|\| busy) && retry count not exhausted | increment retry count | SEND_ASYNC_INQUIRY |
| t36 | INQ_OUTSTANDING | (benign check \|\| reservation conflict \|\| illegal request \|\| busy) && retry count not exhausted | increment retry count | SEND_INQUIRY |
| t37 | ASYNC_INQ_OUTSTANDING | (benign check \|\| reservation conflict \|\| illegal request \|\| busy) && retry count exhausted | indicate DV failed for this device reset retry count | GET_NEXT_DEVICE |
| t38 | INQ_OUTSTANDING | (benign check \|\| reservation conflict \|\| illegal request \|\| busy) && retry count exhausted | indicate DV failed for this device reset retry count | GET_NEXT_DEVICE |
| t39 | ASYNC_INQ_OUTSTANDING | (throttling check \|\| data error \|\| other exception) | indicate DV failed for this device reset retry count | GET_NEXT_DEVICE |
| t40 | INQ_OUTSTANDING | (throttling check \|\| data error \|\| other exception) && throttling is possible | Throttle | SEND_INQUIRY |
| t41 | INQ_OUTSTANDING | (throttling check \|\| data error \|\| other exception) && throttling is not possible | indicate DV failed for this device reset retry count | GET_NEXT_DEVICE |
| t42 | ASYNC_INQ_OUTSTANDING | good completion && data miscompare | indicate DV failed for this device reset retry count | GET_NEXT_DEVICE |
| t43 | INQ_OUTSTANDING | good completion && data miscompare && throttling is possible | Throttle | SEND_INQUIRY |

State Transition Table -continued

| Transition | State | Condition | Action | next |
|---|---|---|---|---|
| t44 | INQ_OUTSTANDING | good completion && data miscompare && throttling is not possible | indicate DV failed for this device reset retry count | GET_NEXT_DEVICE |
| t45 | INQ_OUTSTANDING | good completion && no data miscompare && enhanced DV enabled | reset retry count | SEND_REBD |
| t46 | ASYNC_INQ_OUTSTANDING | good completion && no data miscompare && enhanced DV enabled | reset retry count | SEND_INQUIRY |
| t47 | INQ_OUTSTANDING | good completion && no data miscompare && enhanced DV not enabled | indicate DV done for this device | GET_NEXT_DEVICE |
| t48 | ASYNC_INQ_OUTSTANDING | good completion && no data miscompare && enhanced DV not enabled | reset retry count | SEND_INQUIRY |
| t49 | GET_NEXT_DEVICE | | set DV state to Done | stop |

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enhanced level testing for verifying bus performance in a multiple initiator environment, a first initiator implementing the method, comprising:
    generating a key data pattern including a key header and a pattern, the key header including data identifying the first initiator;
    writing the key data pattern to an echo buffer of a target;
    reading the key data pattern from the echo buffer of the target; and
    examining the key header read from the echo buffer to ascertain a level of communication integrity of a physical connection with the target, the examining determining a throughput capability of the physical connection, the examining includes determining whether the key data pattern read from the echo buffer includes a byte miscompare.

2. A method for enhanced level testing for verifying bus performance in a multiple initiator environment as recited in claim 1, wherein generating the key header includes:
    generating a byte 0;
    generating a byte 1;
    generating a byte 2; and
    generating a byte 3.

3. A method for enhanced level testing for verifying bus performance in a multiple initiator environment as recited in claim 2, wherein the byte 0 is an ID byte, the byte 1 is a host ID, the byte 2 is a logical negation of the host ID, and byte 3 is a logical negation of the ID byte.

4. A method for enhanced level testing for verifying bus performance in a multiple initiator environment as recited in claim 3, wherein the ID byte is a manufacturer signature ID, and the host ID is an initiator ID.

5. A method for enhanced level testing for verifying bus performance in a multiple initiator environment as recited in claim 1, wherein examining the key header includes one of:

determining whether the echo buffer returns an error indication;

determining whether data of the key header has been changed; or determining whether the data in the key header specifically indicates a collision with data from another initiator using a same key header system.

6. A method for enhanced level testing for verifying bus performance in a multiple initiator environment as recited in claim 5, wherein the determining of whether data of the key header has been changed occurs when the multiple initiators are heterogeneous.

7. A method for enhanced level testing for verifying bus performance in a multiple initiator environment as recited in claim 5, wherein the determining of whether the data in the key header specifically indicates the collision occurs when the multiple initiators are homogeneous.

8. A method for enhanced level testing for verifying bus performance in a multiple initiator environment as recited in claim 5, wherein when it is determined that the error indication is returned from the echo buffer, the first initiator being configured to rewrite the key data pattern to the echo buffer, the rewriting being performed for a set number of times before an adjustment is made to the level of communication integrity of the physical connection with the target.

9. A method for enhanced level testing for verifying bus performance in a multiple initiator environment as recited in claim 6, wherein when it is determined that the data of the key header has been changed, the first initiator being configured to rewrite the key data pattern to the echo buffer, the rewriting being performed for a set number of times before an adjustment is made to the level of communication integrity of the physical connection with the target.

10. A method for enhanced level testing for verifying bus performance in a multiple initiator environment as recited in claim 7, wherein when it is determined that the data in the key header specifically indicates the collision with data from another initiator using the same key header system, the first initiator being configured to rewrite the key data pattern to the echo buffer, the rewriting being performed for a set number of times before an adjustment is made to the level of communication integrity of the physical connection with the target.

11. A method for enhanced level testing for verifying bus performance in a multiple initiator environment as recited in claim 7, wherein the collision occurs when a byte 0 matches a specific manufacturer ID, a byte 1 does not match the first initiator's ID, a byte 2 is a logical negation of byte 1, and a byte 3 is a logical negation of byte 0.

12. A method for enhanced level testing for verifying bus performance in a multiple initiator environment as recited in claim 6, wherein when it is determined that data of the key header has been changed, it is assumed that a collision occurred.

13. A method for enhanced level testing for verifying bus performance in a multiple initiator environment as recited in claim 1, wherein writing the key data pattern includes:

sending linked commands to the echo buffer to prevent the echo buffer from receiving data from another initiator, the linked commands being configured to link write and read commands and to disable a SCSI disconnection.

14. A computer implemented method for enhanced level testing for verifying bus performance in a multiple initiator environment that includes at least a first initiator and a second initiator in communication with a target device, the method comprising:

generating a key data pattern, the key header including data identifying the first initiator;

sending a write echo buffer (WEB) command to write the key data pattern to an echo buffer of the target;

sending a read echo buffer (REB) command to the echo buffer, the REB command being configured to request a transmission of the key data pattern from the echo buffer to the first initiator; and examining the key data pattern received from the echo buffer to ascertain a level of communication integrity of a physical connection between the first initiator and the target device, the examining determining a throughput capability of the physical connection, the examining includes determining whether the key data pattern received from the echo buffer includes a byte miscompare.

15. A computer implemented method for enhanced level testing for verifying bus performance in a multiple initiator environment as recited in claim 14, wherein before the key data pattern is generated, the method includes:

sending an asynchronous inquiry to the target device, the asynchronous inquiry being configured to request a transmission of a valid data pattern from the target device and receiving the valid data pattern from the target device in response to the asynchronous inquiry; and sending a synchronous inquiry to the target device, the synchronous inquiry being configured to request a faster transmission of another valid data pattern in order to negotiate an optimal throughput speed with the target device and receiving the another valid data pattern from the target device in response to the synchronous inquiry.

16. A computer implemented method for enhanced level testing for verifying bus performance in a multiple initiator environment as recited in claim 15, wherein after the sending of the synchronous inquiry, the method includes:

sending a read echo buffer description (REBD) command to the echo buffer of the target, the REBD command being configured to request information regarding a size of the echo buffer and whether the echo buffer supports collision detection.

17. A computer implemented method for enhanced level testing for verifying bus performance in a multiple initiator environment as recited in claim 14, further comprising:

detecting a data collision during the examining of the key data pattern received from the echo buffer; and if a collision is detected, the method includes, re-sending a WEB command with the key data pattern to the echo buffer, the re-sending being performed for a set number of times before an adjustment is made to the level of communication integrity of the physical connection between the first initiator and the target.

18. A computer implemented method for enhanced level testing for verifying bus performance in a multiple initiator environment as recited in claim 14, wherein generating the key header includes:

generating a byte 0;

generating a byte 1;

generating a byte 2;

generating a byte 3; and generating a pattern.

19. A computer implemented method for enhanced level testing for verifying bus performance in a multiple initiator environment as recited in claim 18, wherein the byte 0 is an ID byte, the byte 1 is a host ID, the byte 2 is a logical negation of the host ID, and byte 3 is a logical negation of the ID byte.

20. A computer implemented method for enhanced level testing for verifying bus performance in a multiple initiator environment as recited in claim 19, wherein the ID byte is a manufacturer signature ID, and the host ID is an initiator ID.

21. A computer readable media having program instructions for enhanced level testing for verifying bus performance in a multiple initiator environment that includes at least a first initiator and a second initiator in communication with a target device, the computer readable media comprising:

program instructions for generating a key data pattern;

program instructions for sending a write echo buffer (WEB) command to write the key data pattern to an echo buffer of the target;

program instructions for sending a read echo buffer (REB) command to the echo buffer, the REB command being configured to request a transmission of the key data pattern from the echo buffer to the first initiator; and program instructions for examining the key data pattern received from the echo buffer to ascertain a level of communication integrity of a physical connection between the first initiator and the target device, the program instructions for examining includes program instructions for determining whether the key data pattern received from the echo buffer includes a byte miscompare.

22. A computer readable media as recited in claim 21, further comprising:

program instructions for detecting a data collision during the examining of the key data pattern received from the echo buffer; and if a collision is detected, the method includes, program instructions for re-sending a WEB command with the key data pattern to the echo buffer, the re-sending being performed for a set number of times before an adjustment is made to the level of communication integrity of the physical connection between the first initiator and the target.

23. A computer readable media as recited in claim 21, wherein program instructions for generating the key header includes:

program instructions for generating a byte 0;

program instructions for generating a byte 1;

program instructions for generating a byte 2;

program instructions for generating a byte 3; and program instructions for generating a pattern.

24. A computer readable media as recited in claim 23, wherein the byte 0 is an ID byte, the byte 1 is a host ID, the byte 2 is a logical negation of the host ID, and byte 3 is a logical negation of the ID byte.

* * * * *